United States Patent [19]

Le Bras

[11] Patent Number: 4,756,139

[45] Date of Patent: Jul. 12, 1988

[54] PACKAGING MACHINE

[75] Inventor: Philippe A. Le Bras, Chateauroux, France

[73] Assignee: The Mead Corporation, Dayton, Ohio

[21] Appl. No.: 4,510

[22] Filed: Jan. 20, 1987

[30] Foreign Application Priority Data

Jan. 20, 1986 [GB] United Kingdom ............... 8601282

[51] Int. Cl.$^4$ ...................... B65B 21/06; B65B 21/05; B65B 21/24
[52] U.S. Cl. ......................................... 53/398; 53/48; 53/443; 53/543
[58] Field of Search ................. 53/48, 149, 154, 247, 53/284, 448, 475, 458, 468, 534, 543, 566, 443; 198/425

[56] References Cited

U.S. PATENT DOCUMENTS

| | | | |
|---|---|---|---|
| 3,034,270 | 5/1962 | Nigrelli et al. | 53/566 |
| 3,778,959 | 12/1973 | Langen et al. | 53/543 |
| 3,990,572 | 11/1976 | Fishback | 53/48 |
| 4,098,050 | 7/1978 | Dietz et al. | 53/448 |
| 4,237,673 | 12/1980 | Calvert et al. | 53/48 |

*Primary Examiner*—Horace M. Culver

*Attorney, Agent, or Firm*—Erwin Doerr

[57] ABSTRACT

An article grouping technique is embodied in a machine which continuously end-loads groups of bottles into open-ended carton sleeves. The machine includes a fixed base plate 10 along which a line of bottles (B) move, a series of parallel metering bars (12) spaced apart to receive the open-ended carton sleeves which are mounted for movement together along the base plate. Fixed guides defining infeed conveyors (22, 24) are provided along which bottles to be loaded are fed into the machine. Each of the infeed conveyors converges towards the path of movement of the carton sleeves and each metering bar has a free end section which is movable obliquely across the path of movement of the bottles on the respective infeed conveyors so that a predetermined number of bottles are formed into a sub-group on each of the infeed conveyors between adjacent metering bars. An extra infeed conveyor (38) extends alongside the path of movement of the bottles on opposite sides of the base plate along which the bottle groups can move. A bottle loading mechanism (56, 56a) transversely displaces the sub-groups into the open ends of the carton sleeves during movement of the carton sleeves and the bottle subgroups through the machine.

8 Claims, 4 Drawing Sheets

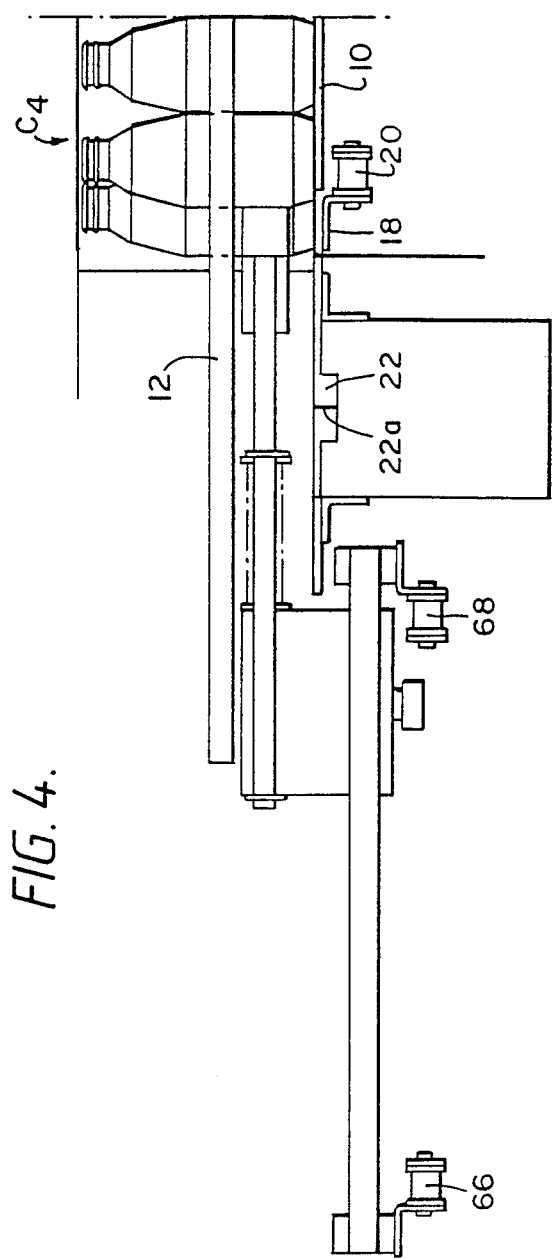

PACKAGING MACHINE

This invention relates to a packaging machine for loading groups of primary packages such as bottles, through the open ends of sleeve type containers.

European Patent No. 0 017 333 discloses a packaging machine which includes a fixed horizontal base plate over which a plurality of spaced apart metering bars are movable with open ended sleeve type containers disposed therebetween. Fixed guides are disposed on each side of the machine and are convergent in the direction of sleeve feed so that primary packages e.g. bottles supplied to the fixed guides on each side of the machine by infeed conveyors are forced by line pressure into the path of movement of the end portions of the metering bars. The metering bars effect a metering operation whereby a predetermined number of primary packages are entrapped between spaced adjacent metering bars at both ends thereof so that continued movement of the metering bars relative to the fixed guides forces the group of articles into each end of the open ended sleeves.

In the above arrangement, the sleeves are loaded so that several uniform rows of packages are present within the sleeve at the completion of loading whereafter the ends of the sleeve are closed.

By contrast, the present invention is concerned with a packaging machine which not only can group and end load packages into the ends of an open ended sleeve but is adapted to conduct the loading so that at least one central row of articles e.g. bottles has fewer articles than each of the next adjacent rows of articles and so that each article in each central row is disposed between a pair of neighbouring articles in each of the next adjacent rows. The formation of articles creates a central void at each end of the sleeve into which end closure panels can then be displaced so as to provide a portion of the carton which may readily be grasped to facilitate portage of the carton.

One aspect of the invention provides a machine for continuously end-loading groups of primary packages into secondary containers which machine comprises a fixed base plate along which a line of secondary packages is movable, a series of parallel metering bars spaced apart to receive said open-end secondary containers therebetween and being mounted for movement together along the base plate, means defining a pair of guide paths, along which primary packages to be loaded are fed into the machine, each of said guide path means converging towards the path of movement of said secondary containers and each metering bar having a free end section which is movable obliquely across the path of movement of the primary packages in respective ones of said guide paths whereby a predetermined number of primary packages are confined in a group in each of said guide paths between adjacent metering bars, characterized by further guide path means extending alongside the path of movement of said secondary containers on opposite sides of said base plate along which said primary package groups can move and by means transversely to displace the primary package groups into the open ends of the secondary containers during movement of the secondary containers and the primary package groups through the machine.

According to a feature of this aspect of the invention each metering bar has adjacent each of its ends a ramp surface extending forwardly of the leading edge of that metering bar and an opposed ramp surface extending rearwardly of the trailing edge of that metering bar whereby a central waisted space is formed between adjacent metering bars.

Another aspect of the invention provides in or for an end-loading packaging machine, a metering bar having a leading and trailing edge and having adjacent each of its ends a ramp surface extending forwardly of the leading edge of the metering bar and an opposed ramp surface extending rearwardly of the trailing edge of the metering bar whereby a central waisted space is formed between a pair of like metering bars disposed in spaced parallel relationship.

A machine embodying the invention will now be described by way of example, with reference to the accompanying drawings, in which:

FIGS. 3 and 4 are views similar to FIG. 2 but as views at the positions of cartons $C_3$ and $C_4$ in FIG. 1.

Figure 1:
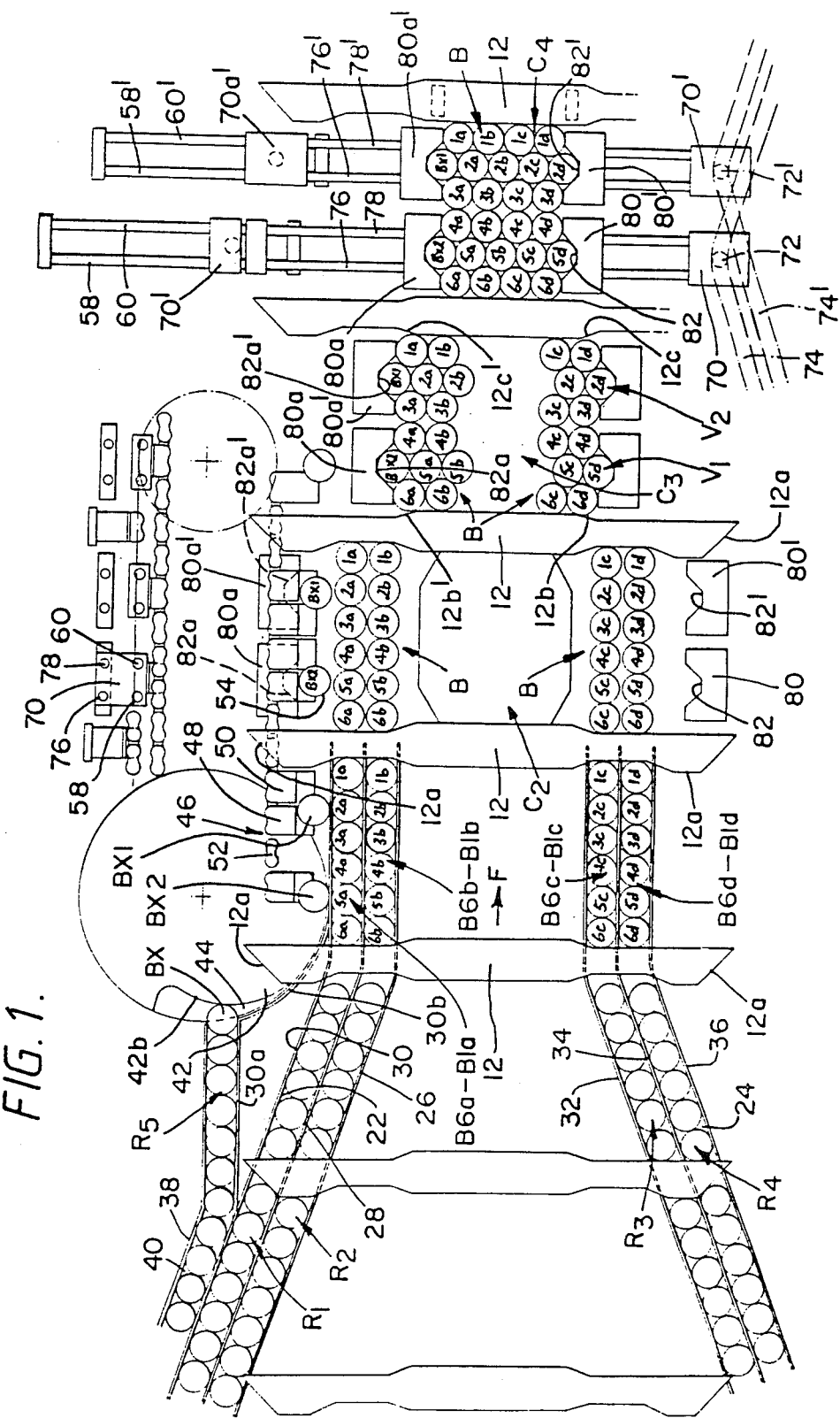
FIG. 1 is a general schematic plan view of the machine showing at successive locations bottle groups being loaded into open-ended cartons.
Figure 2:
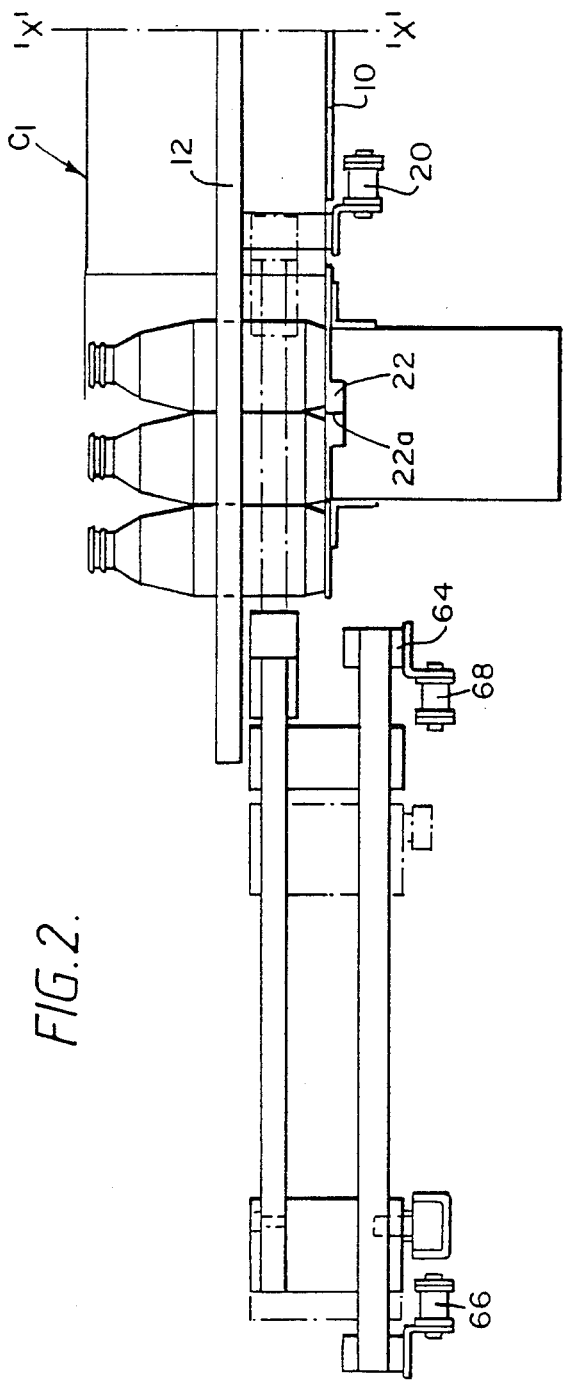
FIG. 2 is a schematic vertical cross-sectional view of the left-hand side of the machine about the general axis of the machine as viewed at the position of carton $C_2$ in FIG. 1.

With reference to the drawings, a fixed base plate is designated by reference numeral 10 and is supported centrally of the machine frame by a structure not shown in the drawings. A plurality of spaced apart movable metering bars 12 are supported in spaced relationship above the base plate by support posts 14, which extend through slots 16 formed in the base plate.

The open end sleeve type cartons C1–C4 are withdrawn from a hopper (not shown) and deposited between successive metering bars 12 by known feeder means so that the cartons then occupy the positions shown between the horizontally disposed spaced apart metering bars. As is conventional practice, a stack of collapsed open-ended sleeve cartons initially are disposed in a hopper above the infeed end of the machine and the cartons are erected from their collapsed condition into their tubular configuration during withdrawal from the hopper.

The lower end of each support post 14 is carried by a bracket 18 connected to an endless chain 20 for imparting movement to the metering bars 12 from left to right as viewed in FIG. 1. The endless chain 20 is mounted in known manner on sprockets and is driven so that the upper working reach of the endless chain moves from left to right as viewed in FIG. 1 so as to move the metering bars from left to right. The cartons interposed between the metering bars are slidably supported by the fixed plate 10 which preferably is formed of low friction plastics material. It will be appreciated that each metering bar also has a further support post connected to another endless chain on the opposite side of the central vertical axis X—X of the machine.

Figure 3:
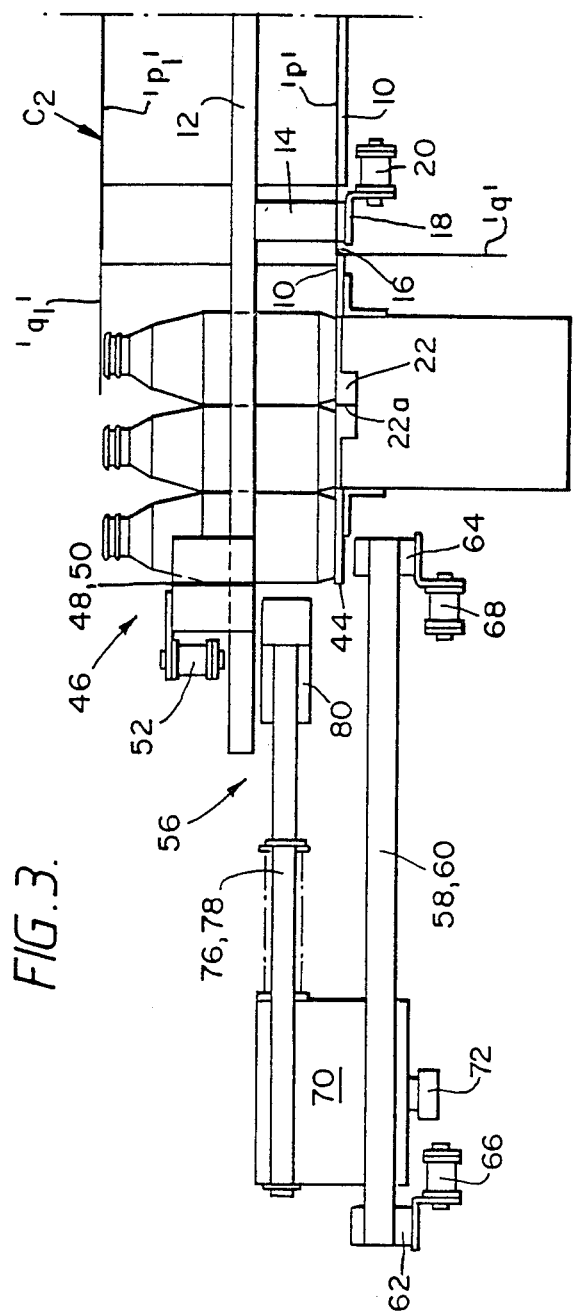

Primary packages e.g. bottles to be loaded into each of the cartons are supplied to the machine on infeed conveyors 22 and 24 one on either side of the base plate 12. In practice, it may be desirable to construct each infeed convey as a plurality of separate conveyors since the incoming bottles are arranged in two rows, e.g. conveyor 22 may comprise two like conveyors separated about the mid-point 22a (FIG. 3). The upstream portions of infeed conveyors are divergent towards the carton flow path, that is they extend at an acute angle with respect to the carton feed path.

Bottles in rows $R_1$ and $R_2$ are fed along conveyor 22, the rows being separated by fixed guide bars 26, 28 and 30. Likewise, bottles in rows $R_3$ and $R_4$ are fed along conveyor 24, the rows being separated by fixed guide bars 32, 34 and 36.

As is known in the art, since the length of the metering bars 12 is fixed and since the end portions of these bars have a backwardly raked trailing edge to form a wedge-shaped end at 12a, these bars serve as metering devices for entrapping a predetermined number of bottles between successive bars due to the fact that the conveyors 22, 24 and their guides 26, 28, 30 and 32, 34, 36 are directed at an acute angle inwardly toward the path of movement of the metering bars.

In this embodiment the metering bars entrap a group of twelve bottles on each of the conveyors 22 and 24 arranged in two parallel rows $R_1$, $R_2$ and $R_3$, $R_4$ having six bottles per row. Immediately after the point at which the bottle groups have been formed, the conveyors and their associated guides extend parallel to the carton flow path so that the bottle groups are conveyed alongside the opposed open ends of the carton sleeves.

As will become apparent, in order to form the bottles into the required configuration, it is necessary to introduce two extra bottles into one of the bottle groups. In order to achieve this, an additional infeed conveyor 38 is provided alongside the infeed conveyor 22 having bottle row $R_1$ and the bottles in a further bottle row $R_5$ conveyed therealong are guided by fixed guides 30 and 40. At or about the position of bottle grouping by the metering bars 12, the additional conveyor is deflected outwardly so that it extends parallel to the carton feed path but spaced away from infeed conveyor 22. A bottle flow control device is provided at the outfeed end of the additional conveyor 38 and comprises a metering disc 42 disposed adjacent the initial portion of conveyor 22 which extends parallel to the flow path. Additional conveyor 38 is flanked by fixed guides 40 and 30a.

The metering disc 42 is mounted for rotation, by suitable drive means, in a horizontal plane between a fixed elongate platform 44 and below the metering disc and an endless series of bottle conveying elements designated generally by the reference numeral 46 located above the disc. Platform 44 has an initial arcuate portion flanked by a curved portion 30b of the fixed guide 30a and a linear portion extending alongside the conveyor 22 in the flow direction 'F'. The curved portion 30b of the fixed guide merges with the linear fixed guide 30 where guide 30 extends parallel to the flow direction 'F'. Platform 44 is disposed in the same plane as conveyors 22, 24 and the base plate 10 of the machine.

The endless series of bottle conveying elements comprises a number of pairs of spaced conveyor blocks 48, 50 spaced apart a predetermined distance along an endless chain 52 entrained about spaced sprockets.

Each pair of conveyor blocks extends outwardly from and have a working face which is shaped to form between the blocks a bottle receiving cavity 54. The conveyor blocks are constrained to move along a working reach parallel to and adjacent bottle row $R_1$ in the feed direction F and along a parallel return reach remote from bottle row $R_1$ opposed to the feed direction F. As the conveyor blocks transfer from the return reach to the working reach the open mouth of each bottle receiving cavity passes closely adjacent the outfeed end of the additional infeed conveyor 38.

Metering disc 42 is positioned such that during rotation thereof the major portion of its periphery covering an arc of about 270° passes across the outfeed end of conveyor 38 so that no bottles are permitted to issue therefrom. However, a peripheral recessed portion 42b of the disc covering an arc of about 90° is formed in the disc which progressively allows the leading bottle BX to issue from conveyor 38 as the recessed portion 42b passes across the outfeed end of the conveyor 38. The disposition of the conveyor blocks along endless chain 52 and the rotation speeds of the metering disc and drive sprocket of chain 52 is such that a bottle receiving cavity is present at the outfeed end of conveyor when the peripheral recessed portion 42b of the disc is at the location shown. It is at this location whereat the lead bottle engages about midway along the recessed periphery that the mouth of a bottle receiving cavity 54 is positioned to receive the lead bottle. Thereafter, as the lead bottle progressively engages the more severely reduced diametral extent of the recessed peripheral portion, the lead bottle correspondingly is further received into the cavity until when fully received into the cavity engages approximately an 180° arc of the bottle circumference.

The next succeeding bottle on conveyor 38 is likewise received by the next succeeding pair of bottle conveying blocks. The working reach of the endless chain is positioned so that the conveying blocks receive portions of the bottle extending above the metering bars as seen in FIG. 3. The conveying blocks also are located along the endless chain 52 so that two extra bottles BX1 and BX2 are introduced to each group of bottles conveyed in the feed direction 'F' on conveyor 22. It will be seen that bottle BX1 is held and moved by conveyor blocks 48, 50 such that it is located alongside the second pair of bottles B2a, B2b in the group and that bottle BX2 is held and moved by the next succeeding conveyor blocks such that it is located alongside the penultimate pair of bottles B5a, B5b in the same group. Endless chain 52 is moved in synchronism with conveyor 22 so that bottles BX1 and BX2 are maintained in these relative positions.

The bottle groups conveyed on either side of the base plate are now ready to be end loaded into a carton. For this purpose, an end loading mechanism 56, 56a is provided at each side of the machine outboard of the ends of the metering bars between the positions of cartons $C_2$–$C_4$ and is described below.

End loading mechanism 56 comprises a pair of lower fixed parallel shafts 58, 60 connected as at each of their opposite ends by mounting elements 62, 64 to endless chains 66, 68 respectively. Endless chains 66, 68 are entrained about spaced sprockets (not shown) so that the chains are driven in their working reach in the flow direction 'F'. A slidable cam follower block 70 has its lower end mounted on shafts 66, 68 for axial movement therealong and a cam roller 72 projected downwardly from the lower face of the cam follower block 70 and engages in a fixed cam track 74. At its upper end the cam follower block is connected to one end of a pair of parallel rods 76, 78 the opposite end of which carry a bottle pusher element 80. The bottle pusher element 80 has a front face formed to provide a bottle receiving recess 82.

The whole end loading mechanism 56 moves alongside a bottle group in the flow direction and a series of pairs of such cam follower block assemblies including parallel shafts and bottle pusher element are mounted in side by side by side relationship along the chains 66, 68. The arrangement is such that a pair of these pusher assemblies is provided on each side of the carton and bottle flow path for each group of bottles. The pusher assemblies are positioned so that when the pusher elements come alongside a bottle group at carton position C2, pusher element 80 has its recess 82 aligned with bottle pair B5c, B5d; pusher element 80' has its recess aligned with bottle pair B2c, B2d; pusher element 80a has its recess 82a aligned with bottle pair B5a, B5b and pusher element 80a' has its recess 82a' aligned with bottle pair B2a, B2b.

Referring to cam follower block 70, the cam track 74 associated with roller follower 72 extends at an oblique angle inwardly of the flow path 'F' of the machine between carton locations C2 and C4 the track being at its minimum distance from the support plate 10 at carton position C4. At carton position C4 the cam track extends away from the machine at an oblique angle. The arrangement of cam follower block 70' and cam track 74' is similar, these assemblies and their associated cam tracks being vertically displaced relative to one another. On the opposite side of the machine, a like arrangement of pusher assemblies and cam tracks is provided.

Thus as the pusher assemblies are moved forwardly in the flow direction, the cam blocks and therefor the pusher elements simultaneously are moved progressively in a transverse direction by virtue of the guidance given by the cam tracks. At carton position C3 bottle pusher elements 80 and 80a has engaged the bottle group on one side of the machine and bottle pusher element 80a and 80a' has engaged the bottle group on the opposite side of the machine.

It will be seen that each of the metering bars has a forwardly extending ramp surface 12b, 12b' along its leading edge and a rearwardly extending ramp surface 12c, 12c' along its trailing edge adjacent the ends of the metering bars. Thus, a pair of successive metering bars provide a central waisted zone occupied by the tubular carton sleeve into which the bottle groups are guided during end loading. At carton position C3, bottle B5d is engaged in the pusher recess 82 and bottle pairs B6c, B6d and B4c, B4d are displaced inwardly relative to bottle pair B5c, B5d, thus creating a void V1 in front of bottle B5c. Likewise bottle B2d is engaged in the pusher recess 82' and bottle pairs B3c, B3d and B1c, B1d are displaced inwardly relative to bottle pair B2c, B2d thus creating a void V2 in front of bottle B2c.

This displacing action is created by virtue of the restrictive passageway formed by the juxtaposed ramp surfaces 12b, 12c of the adjacent metering bars which are engaged by the leading and trailing bottle pair during transverse movement of the bottle pushers. On the opposite side of the machine, at carton position C3, a similar displacement of the bottle group occurs except that by virtue of the presence of extra bottles BX1 and BX2 in alignment with bottle pairs B2a, B2b and B5a, B5b, the bottles B2b and B5b are pushed proud of the other bottles in the group.

At carton position C4 the pusher elements have arrived at their furthest inward extension so that the opposed bottle groups are pushed towards one another into the carton sleeve occupying the waisted zone between the adjacent metering bars. When fully loaded bottle B5b nests into the void V1 and bottle B2b nests into the void V2 thus creating end voids V3, V4 at the ends of the combined bottle group between bottle rows B2 and B5.

The pusher elements progressively are retracted from the carton sleeve ends caused by movement the roller followers of the cam blocks being guided along the outwardly extending portions of their cam tracks.

Thereafter, the carton sleeve ends may be closed to complete the packaging operation.

Referring to FIG. 3, the relative position of the carton end panels to permit end loading is shown schematically. Base panel 'p' is superposed on support plate 10 and bottom end closure panels 'q' hinged thereto extend downwardly through the slot 16 in support plate 10. Top panel 'p1' and top end closure panels 'q1' hinged thereto are aligned in spaced parallel relationship with respect to the plane of the support plate 10 thus giving an unobstructed end aperture through which the bottles may be transferred from the side conveyors of the machine.

I claim:

1. A method of loading groups of cylindrical articles such as bottles or cans into open-ended sleeves, comprising the steps of feeding streams of articles along the opposing open ends of said sleeves, forming opposing groups of articles of which each comprises at least three adjacent rows of articles disposed in general alignment with said open ends of said sleeve, reorganizing said groups so that one article in one group projects in the direction of the adjacent open end of the sleeve and with respect to the adjacent articles of said one group and a corresponding matching recess is formed in the opposing group, moving said opposing groups toward each other and into the open ends of said sleeve so that one consolidated group of articles is formed within the sleeve whereby said projecting article of said one group occupies said recess in said other group.

2. The method according to claim 1, further characterized in that articles in said groups are arranged in mutually nesting relationship when being moved into said sleeve.

3. The method according to claim 1, wherein the number of articles in said one group exceeds the number of articles in said opposing group by at least one.

4. The method according to claim 1, wherein each of said groups are reorganized so as to provide an intermediate recess at the ends of said sleeve when positioned therein.

5. A machine for continuously loading groups of cylindrical articles such as bottles or cans into sleeve-type cartons through the open ends thereof, comprising a fixed base plate extending longitudinally in machine direction, a series of transversely extending metering bars mounted on endless chains for movement in machine direction above said base plate and arranged in spaced relationship to receive said cartons therebetween with the open ends of the cartons being disposed on opposite sides of said base plate, infeed means extending on each side of said base plate for feeding said articles in a continuous stream, guide means disposed above said infeed means and converging toward the open ends of said cartons, said metering bars having wedge-shaped end portions effective to intersect the path of said articles advancing on said infeed means to separate said stream of articles into groups so that a predetermined number of articles is confined between adjacent metering bars on each side of said base plate, and means for pushing said groups of articles transversely into the open ends of said cartons, characterized in that each metering bar is provided with ramp surfaces projecting forwardly and rearwardly from the leading and trailing edges thereof, respectively, and extending intermediate said end portions whereby a central reduced space is formed between successive metering bars at the location where said carton is received, said ramp surfaces being arranged and configured so as to guide said articles into the open ends of said cartons.

6. The machine according to claim 5, further comprising an additional infeed means disposed adjacent said infeed means on one side of said base plate to sequentially introduce additional articles to each group of articles on said one side of the base plate.

7. The machine according to claim 5, wherein said pushing means comprises reciprocating plungers effective to rearrange said articles in said groups as the articles are pushed along said ramp surfaces toward the open ends of said cartons.

8. The machine according to claim 7, wherein the articles in said group are rearranged from an abutting to a mutually nested relationship and so that at least one article in said one group of articles projects with respect to the adjacent articles of said one group and a matching recess is formed in the opposing group on the other side of said base plate.

* * * * *